United States Patent Office 3,532,684
Patented Oct. 6, 1970

3,532,684
MOLECULAR COMPOUNDS OF INOSINE AND TRYPTOPHAN
Yoshihisa Suzuki, Kawasaki-shi, Tsuneo Hirahara and Takekazu Akashi, Tokyo, and Tadashi Nakamura, Fujisawa-shi, Japan, assignors to Ajinomoto Co., Inc., Tokyo, Japan
No Drawing. Continuation of application Ser. No. 646,177, June 15, 1967. This application Jan. 30, 1968, Ser. No. 701,534
Claims priority, application Japan, June 18, 1966, 41/39,418; Jan. 28, 1967, 42/5,488
Int. Cl. C07d 27/60, 51/54
U.S. Cl. 260—211.5                                                4 Claims

ABSTRACT OF THE DISCLOSURE

Equimolecular amounts of inosine and tryptophan readily form crystalline molecular compounds which are sparingly soluble in water. The compound of L-tryptophan with inosine is less soluble than that of D-tryptophan. Both compounds may thus be purified and DL-tryptophan may be optically resolved by conversion to the molecular compound. Analogous compounds are not formed by chemically closely related substances.

REFERENCE TO RELATED APPLICATION

This application is a continuation of the copending application Ser. No. 646,177, filed on June 15, 1967 and now abandoned.

BACKGROUND OF THE INVENTION

This invention relates to novel molecular compounds of inosine and tryptophan, and to their use in the purification of either constituent and in the optical resolution of DL-tryptophan.

Inosine has found medicinal applications and is an intermediate in the preparation of inosinic acid whose sodium salt is a seasoning agent. L-tryptophan is one of the essential amino acids and is being used as a nutrient.

SUMMARY OF THE INVENTION

It has now been found that inosine and tryptophan form crystalline molecular compounds which are sparingly soluble in water and are stable in the presence of water over a pH range from 1 to 10 at relatively low temperature, and from pH 3 to 8 at all practical temperatures. The molecular ratio of inosine to tryptophan in the compounds is 1:1.

The compound of inosine with L-tryptophan is less soluble in water than the compound of D-tryptophan with inosine, and synthetic DL-tryptophan may thus be optically resolved by recrystallizing the mixture of molecular compounds of DL-tryptophan with inosine. D-tryptophan is readily racemized by heating so that DL-tryptophan may be completely converted to L-tryptophan by treatment wtih a limited amount of inosine which is recovered after decomposition of the molecular compound.

The reaction with tryptophan is specific to inosine, and analogous molecular compounds are not formed with tryptophan by closely related compounds such as hypoxanthine and guanosine, so that pure inosine may be recovered from crude broths obtained by microbial fermentation by conversion to the tryptophan compound.

Because of the wide pH range over which the molecular compounds are stable, they may be formed from aqueous solutions of free inosine and free tryptophan or from solutions of salts of either constituent, such as the alkali metal salts of inosine and the acid addition salts of tryptophan. The aqueous medium may contain inorganic ions which do not form insoluble salts with inosine or tryptophan and organic solvents which are miscible with water, such as the lower alkanols and lower ketones.

The composition of the molecular compound precipitated from the aqueous liquor is not affected by the concentration of the constituents in the liquor. Even when either constituent is in tenfold excess over the other, the crystalline precipitate consists of equimolecular amounts of inosine and tryptophan. It forms promptly at room temperature but the reaction may also be performed at elevated temperature. Aqueous solutions of the constituents may be mixed with each other, or the aqueous solution of either may be brought into contact with the other constituent in solid form. The ultimately formed crystalline precipitate may be separated from the mother liquor in any conventional manner.

The needle-shaped precipitate obtained by crystallization at ordinary temperature from inosine and L-tryptophan contains three molecules of crystal water. The trihydrate looses water between 67 and 113° C. to form a monohydrate which is converted to an anhydrous form at 147° C. The anhydrous molecular compound melts with decomposition at 195° C. whereas inosine decomposes at 215° C. and L-tryptophan at 289° C.

The molecular compound of inosine and tryptophan may be decomposed by ion-exchange chromatography. It is also decomposed by contact with aqueous solutions having a pH above 10. An insoluble inosine salt is crystallized at the high pH from a solution in which the tryptophan is a solute. The salt is readily converted to pure inosine in an aqueous acid medium.

The molecular compound is somewhat soluble in methanol, from which the inosine crystallizes. This crystallization may be hastened by seeding. The water content of the methanol must be less than about 5% by volume, and the ratio of the molecular compound to the methanol should not be greater than 20 g. per liter, and is preferably only 15 g. per liter or less. The time required for dissolving the molecular compound and precipitating the inosine varies with the particle size of the compound and with agitation. The temperature of the methanol should be low to reduce the solubility of the inosine.

Ethanol, acetone and other common organic solvents cannot be substituted for the methanol because of similar solubilities of inosine and tryptophan or because of insolubility of the molecular compound, or both.

The optical resolution of DL-tryptophan by conversion to a mixture of the inosine compounds which differ in solubility, and can be separated by recrystallization, is simpler, less costly and more convenient than the conventional methods which require conversion of tryptophan to N-acyl derivatives or to alkyl esters, and use optically active reaction partners. The present invention reacts DL-tryptophan itself in a very simple reaction with inosine which is relatively inexpensive and can be recovered practically 100% during decomposition of the molecular compound.

The molecular compound of inosine with D-tryptophan which is obtained by crystallization from water at ordinary temperature contains only one molecule of crystal water against three molecules in the corresponding compound of L-tryptophan. The melting point of the D-tryptophan compound is 193° C. against 195° C. for the L-tryptophan compound. The two compounds differ in their elementary analyses, as may be expected from the different water contents:

Inosine-L-tryptophan trihydrate.—Calcd. for $$C_{21}H_{30}N_6O_{10}$$

(percent): C, 48.91; H, 5.74; N, 15.96. Found (percent): C, 48.17; H, 5.94; N, 16.02.

Inosine - D - tryptophan monohydrate.—Calcd. for $C_{21}H_{26}N_6O_6$ (percent): C, 51.42; H, 5.34; N, 17.14. Found (percent): C, 51.39; H, 5.44; N, 17.15.

The two compounds have distinctly different X-ray powder diffraction spectra as is shown below (CuKα) in which the highest peaks were assigned a value of 100 and other peak heights above the background were scaled accordingly:

| Inosine-L-Tryptophan. $3H_2O$ | | | Inosine-D-Tryptophan. $H_2O$ | | |
|---|---|---|---|---|---|
| 2 (°) | d (A.) | $I/I_o$ | 2 (°) | d (A.) | $I/I_o$ |
| 8.3 | 10.7 | 30 | 8.9 | 9.9 | 20 |
| 11.6 | 7.6 | 100 | 10.4 | 8.53 | 20 |
| 14.0 | 6.35 | 90 | 12.4 | 7.14 | 20 |
| 15.9 | 5.57 | 30 | 15.1 | 5.87 | 30 |
| 16.6 | 5.34 | 50 | 15.4 | 5.75 | 20 |
| 17.5 | 5.07 | 50 | 17.0 | 5.23 | 100 |
| 26.8 | 3.33 | 30 | 17.6 | 5.07 | 40 |
| 27.4 | 3.25 | 30 | 26.8 | 3.33 | 20 |
| | | | 28.3 | 3.15 | 20 |

Corresponding values for inosine and D- or L-tryptophan are given for comparison:

| Inosine | | | D- or L-Tryptophan | | |
|---|---|---|---|---|---|
| 2 (°) | d (A.) | $I/I_o$ | 2 (°) | d (A.) | $I/I_o$ |
| 8.3 | 10.7 | 20 | 4.9 | 18.0 | 100 |
| 10.6 | 8.4 | 100 | 9.9 | 8.9 | 20 |
| 13.3 | 6.68 | 30 | 14.8 | 5.99 | 50 |
| 13.9 | 6.37 | 60 | 18.3 | 4.85 | 100 |
| 14.1 | 6.30 | 50 | 22.5 | 3.95 | 40 |
| 17.9 | 4.98 | 40 | 23.2 | 3.83 | 50 |
| 21.9 | 4.07 | 20 | 23.5 | 3.79 | 40 |

The solubilities in water at various temperatures are listed below for inosine-L-tryptophan-trihydrate, inosine-D-tryptophan monohydrate, inosine, and L-tryptophan, the solubility values of the molecular compounds being reduced to the anhydrous compounds:

| | Solubility, percent | | |
|---|---|---|---|
| | 10° C. | 30° C. | 50° C. |
| Inosine-L-tryptophan.$3H_2O$ | 0.174 | 0.470 | 1.08 |
| Inosine-D-tryptophan.$H_2O$ | 0.245 | 0.620 | 1.46 |
| Inosine | 0.95 | 3.16 | 8.37 |
| L-tryptophan | 0.92 | 1.20 | 1.68 |

The separation of the molecular compounds of inosine with L-tryptophan and D-tryptophan by fractional crystallization is facilitated by adding to the aqueous liquor certain organic solvents which enhance the difference in solubility between the two isomeric compounds. Methanol and ethanol are particularly suitable for crystallizing most of the L-tryptophan compound before any D-tryptophan compound crystallizes. Seeding with the desired crystals is beneficial.

The recovered crystals may be decomposed by dissolving them in water containing enough mineral acid to adjust the pH to 1–2, and passing the solution over a column of a cation exchange resin in the $NH_4$-form which absorbs the tryptophan while the inosine passes through the column, and may be used for preparing additional molecular compound. The tryptophan is then eluted by means of aqueous ammonia solution, and recovered from the ammoniacal elute in a conventional manner, as by partial evaporation and cooling.

The D-tryptophan, which may be recovered from the mother liquor, is readily racemized by heating, as disclosed in Pat. No. 3,213,106, so that a batch of DL-tryptophan may be converted practically completely to L-tryptophan. Actually, it is not necessary to isolate the D-tryptophan but the mother liquor remaining after the fractional crystallization of the L-tryptophan may be heated directly to convert the D-tryptophan therein to the racemate in the presence of the inosine.

DESCRIPTION OF PREFERRED EMBODIMENTS

The following examples are further illustrative of the invention but it will be understood that the invention is not limited thereto.

Example 1

5.7 g. inosine and 4.3 g. L-tryptophan were stirred with one liter water with heating until a solution was obtained. When the solution was permitted to cool, the molecular compound of inosine and L-tryptophan crystallized. The crystals were recovered by filtration and dried in air at room temperature. They weighed 9.7 g. (87% yield) and decomposed at 195° C. The compound was identified by its X-ray diffraction spectrum and by elementary analysis.

Example 2

500 g. of a 3.3% solution of inosine were stirred with 12.6 g. L-tryptophan crystals. The mixture was then left to stand at room temperature for two hours, and was stored overnight at 5° C. The crystalline precipitate formed thereby consisted of the molecular compound of inosine and tryptophan and weighed 30.5 g. (95% yield). The compound was identified by its melting point and by its X-ray diffraction spectrum.

Example 3

30 g. crystalline inosine contaminated with 0.9 g. guanosine were dissolved in 300 ml. water. The solution was mixed with 1.2 liters of a hot solution containing 22.2 g. L-tryptophan. When the mixture was cooled to room temperature, the inosine-tryptophan compound crystallized and was filtered off. The crystals weighed 45 g. when dry, indicating a recovery of 82% of the inosine originally present. The crystals were found to be free from guanosine by paper chromatography.

When another batch of the contaminated inosine was recrystallized from water in the usual manner, only 60% of the inosine was recovered and contained significant amounts of guanosine, as determined by paper chromatography.

33 g. inosine-tryptophan crystals were suspended in 200 ml. water, and the suspension was heated and adjusted to pH 11 with sodium hydroxide, whereby a clear solution was formed. The latter was evaporated to 40 ml., and the concentrate was cooled to 5° C. whereby the sodium salt of inosine was crystallized (21 g.). The salt was dissolved in 200 ml. water at 50° C., and 13 g. inosine of 100% purity were precipitated from the solution by adjusting the pH to 5.0 with hydrochloric acid.

Example 4

A fermentation broth containing inosine was mixed with diatomaceous earth (Celite) and filtered. The clear filtrate had a volume of 300 ml. and contained 3.9 g. inosine. It was evaporated to about 50 ml. and cooled to 5° C. Four hours later, 3 g. of crude crystals containing 2.5 inosine were recovered by filtration. The combined mother liquor and washings contained 1.2 g. inosine in 60 ml. To this solution, 1.0 g. L-tryptophan was added at 20° C. together with trace amounts of seed crystals of the inosine-tryptophan compound. The mixture was stirred for one hour, and then held at 5° C. for two hours, whereupon it was filtered. The crystals so recovered weighed 2.1 g. and contained 1.0 g. inosine.

They were ground to a fine powder and suspended in 200 ml. methanol. A trace amount of crystalline inosine was added to the suspension which was then stirred for about 5 hours at 10° C. The inosine crystals recovered thereafter by filtration, washing, and drying, weighed 0.8 g. and constituted 66% of the inosine originally present in the mother liquor and washings. The total yield of inosine from the filtered fermentation broth was 85%.

Example 5

1.02 g. DL-tryptophan were dissolved in 200 ml. water at about 70° C., and 0.66 g. inosine was added to the hot solution which was then cooled with stirring to 30° C. at which temperature the crystallization of the molecular compound of inosine with L-tryptophan started, and further to 10° C. The precipitated crystals of the molecular compound were filtered off one hour later and weighed 1.0 g. They contained 32.9% inosine, 24.9% L-tryptophan, and 0.9% D-tryptophan, as determined by ultraviolet absorption and optical rotation:

$$[\alpha]_{5461}^{24} = -28.8 \text{ (solvent: water)}$$

The optical purity was 93%. 0.9 g. of the molecular compound was suspended in 30 ml. water, enough hydrochloric acid was added to adjust the pH to 1.5, and the solution so obtained was passed over a column of 5 ml. Dowex 50–W (NH₄ type). The column was washed with water, and the tryptophan was eluted with 100 ml. 0.5 N aqueous ammonium hydroxide solution. The eluate was partly evaporated and cooled to precipitate crystals of L-tryptophan weighing 0.18 g. and free of D-tryptophan.

$$[\alpha]_{5461}^{24} = -34.5$$

Example 6

1.02 g. DL-tryptophan were dissolved in 450 ml. water at about 60° C., and a solution of 1.34 g. inosine in 50 ml. water was added. The mixture was cooled to 10° C., and precipitated crystals were filtered off after 15 hours. They weighed 1.0 g. and consisted of 35.4% inosine, 25.7% L-tryptophan, and 2.5% D-tryptophan.

$$[\alpha]_{5461}^{24} = -29.9$$

When the molecular compound was decomposed by means of ion exchange resin as described in Example 5, 0.2 g. L-tryptophan having an optical purity better than 98% was obtained.

What is claimed is:

1. A molecular compound of inosine with optically active tryptophan stable in contact with cold water at pH 1 to 10, the molecular compound of inosine with L-tryptophan, when in the anhydrous and substantially pure condition melting at 195° C. with decomposition, and the molecular compound of inosine with D-tryptophan, when in said condition, melting at 193° C.

2. A compound as set forth in claim 1, wherein said tryptophan and said isosine are present in equimolecular amounts.

3. A method of preparing a compound as set forth in claim 1, which comprises reacting said inosine and said tryptophan in an aqueous solution at a pH between 1 and 10 until said compound is formed.

4. A method of optically resolving DL-tryptophan which comprises:
   (a) reacting said DL-tryptophan with inosine in an aqueous medium at a pH between 1 and 10 until a mixture of the respective molecular compounds of inosine with L-tryptophan and D-tryptophan as set forth in claim 1 is formed;
   (b) fractionally crystallizing said mixture from an aqueous medium substantially to separate said compounds from each other;
   (c) decomposing said compound of inosine with L-tryptophan into said inosine and said L-tryptophan; and
   (d) separating said L-tryptophan from said inosine.

References Cited

UNITED STATES PATENTS

| | | | |
|---|---|---|---|
| 3,049,536 | 8/1962 | Reiff et al. | 260—211.5 |
| 3,281,410 | 10/1966 | Peter et al. | 260—211.5 |
| 3,074,942 | 1/1963 | Jöhl et al. | 260—326.14 |
| 3,167,566 | 1/1965 | Overby | 260—326.14 |
| 3,242,163 | 3/1966 | Sarett et al. | 260—211 |
| 3,320,282 | 5/1967 | Von Wittenau et al. | 260—326.14 |

LEWIS GOTTS, Primary Examiner

J. R. BROWN, Assistant Examiner

U.S. Cl. X.R.

260—326.14